(No Model.)

R. D. THACKSTON.
SELF CLOSING HATCHWAY.

No. 271,157. Patented Jan. 23, 1883.

Attest:
Charles Pickles
Harry E. Knight

Inventor:
Richard D. Thackston
By Knight Bros
Attys.

UNITED STATES PATENT OFFICE.

RICHARD D. THACKSTON, OF ST. LOUIS, MISSOURI, ASSIGNOR OF ONE-HALF TO HENRY I. COE, OF SAME PLACE.

SELF-CLOSING HATCHWAY.

SPECIFICATION forming part of Letters Patent No. 271,157, dated January 23, 1883.

Application filed July 18, 1882. (No model.)

*To all whom it may concern:*

Be it known that I, RICHARD D. THACKSTON, of the city of St. Louis, in the State of Missouri, have invented a certain new and useful Improvement in Self-Closing Hatchways, of which the following is a full, clear, and exact description, reference being had to the accompanying drawings, forming part of this specification, and in which—

Figure 1:
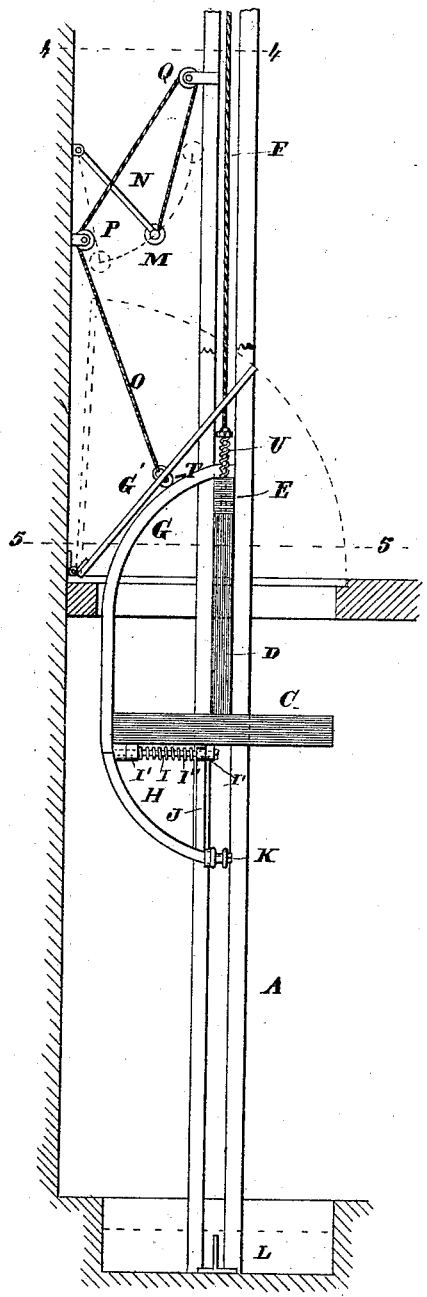
Figure 2:
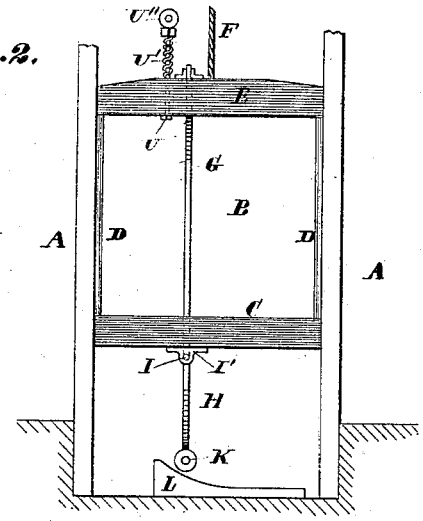
Figure 3:
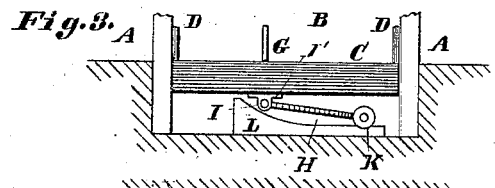
Figure 4:
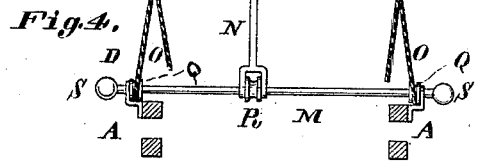
Figure 5:
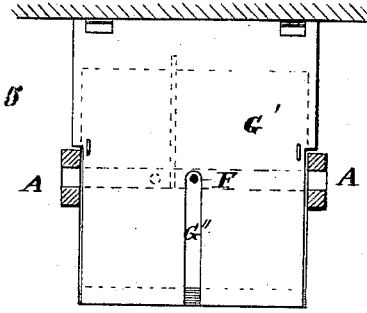

Figure 1 is a vertical section, showing the cage passing through the hatchway. Fig. 2 is a front elevation of the cage, showing the lower ends of the guides, and the cage raised a short distance from its lowest position. Fig. 3 is a detail view of the cage, showing it in its lowest position. Fig. 4 is a transverse section on line 4 4, Fig. 1. Fig. 5 is a transverse section on line 5 5, Fig. 1, showing the door closed.

My invention relates to a hatchway having a single door; and my invention consists in the hereinafter-described mechanism for opening and closing this door by the ascending and descending cage. The means for opening and closing the door from the upper side, being similar to that shown and claimed in Letters Patent No. 268,146, issued to myself and Henry I. Coe on the 28th of November, 1882, is not claimed broadly in this application, but merely as part of the present invention.

A represents the vertical guides of the cage B. The cage consists of a platform, C, upright side strips, D, and connecting-beam E. To the beam E is secured the hoisting-rope F and one end of a cam or curved bar, G, bent as shown in Fig. 1, the other end of which is secured to the back edge of the platform. As the cage ascends this cam comes against and raises the door G' of the hatchway.

Depending from the platform of the cage is a cam or curved bar, H. This cam or curved bar H is hinged to the platform, so that it can be moved to one side and allow the cage to descend to the level of the floor. It is connected to the platform by means of a horizontal shaft or rod, I, having bearing in suitable boxes or brackets, I', secured to the platform, on which its upper end has bearing, and to which its lower end is suspended by means of a plate or rod, J. On the extreme lower end of this cam is a grooved roller, K, which, as the cage descends, strikes a stationary cam, L, located directly beneath it on the lower floor of the building, which throws the cam H to one side, allowing the cage to descend to the level of the floor, as shown in Fig. 3. When the cage is raised the cam H swings back to its vertical position; but to quicken this motion, and also to prevent the cam swinging when the cage is jarred, I surround the rod I by a spiral spring, I'', one end of which is secured to the rod and the other end to the platform of the cage. The purpose of the cam H is to open the door on the descent of the cage by coming against a swinging bar, M, pivoted to the wall of the building by an arm, N, and connected to the door by ropes O O, which pass over grooved pulleys P P, secured to the wall, and similar pulleys, Q Q, secured to the upright guides A. The bar M has a grooved roller, R, against which the cam H strikes, so the cam will not swing to one side in opening the door. This cross-bar M also has weighted ends S S for counterbalancing the door. The forward end of the door has a slot, G'', to receive the hoisting-cable, and it also has a friction-roller, T, on its under side to receive the cam G.

To avoid the sudden jar of the cam coming against the door, I locate a cushion consisting of a sliding post, U, surrounded by spiral springs U', on the cross-beam E. The upper end of the post strikes the door in advance of the cam and slightly raises it; but the spring, yielding to the weight of the door, avoids the sudden jar. I prefer placing a friction-roller, U'', in the upper end of the post, as shown in Fig. 2.

I am aware that a swinging rod secured to the bottom of the cage for opening the doors, and a spring for keeping the rod in the desired vertical position, are not new, broadly considered. I do not therefore claim such construction, but merely my specific arrangement.

I claim as my invention—

1. In a self-closing hatchway, the combination of cage B, operating-cams or curved arms G H, secured to one side of the cage, single door G', having slot G'', and swinging bar M, pivoted to the wall, connected to the door by means of cords, and having grooved roller R, all substantially as set forth.

2. In a self-closing hatchway, the combined platform opening and closing devices consisting of swinging bar M, having grooved roller R, and pivoted to the wall by arm N, cords or ropes O, pulleys Q and P, single door G', having slot G'', cage B, and cams or curved arms G H, substantially as set forth.

3. The combination of cage B, cam H, having roller K, hanger J, rod I, surrounded by a spiral spring, I', secured to the rod and cage by its opposite ends, and stationary cam L, as shown and described, for the purpose set forth.

4. In a self-closing hatchway, the cushion consisting of the post U and spiral spring U', the cushion being secured to the cross-beam of the cage, and arranged to strike the door in advance of the operating-cam as the cage ascends, as set forth.

RICHARD D. THACKSTON.

Witnesses:
SAML. KNIGHT,
GEO. H. KNIGHT.